May 20, 1969      L. MASI      3,445,135

PERFORATED SUN VISOR PARTICULARLY FOR MOTOR VEHICLES

Filed Nov. 4, 1966      Sheet 1 of 3

INVENTOR
LAMBERTO MASI

BY Yount, Raney, Flynn & Jarelli

ATTORNEYS

May 20, 1969  L. MASI  3,445,135
PERFORATED SUN VISOR PARTICULARLY FOR MOTOR VEHICLES
Filed Nov. 4, 1966  Sheet 2 of 3
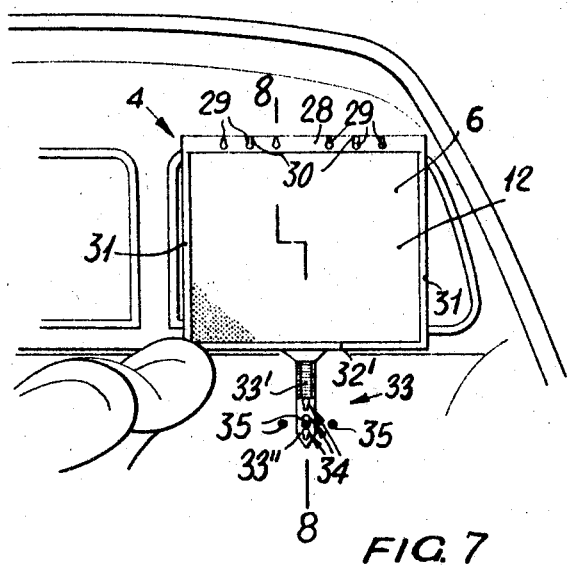
FIG. 7
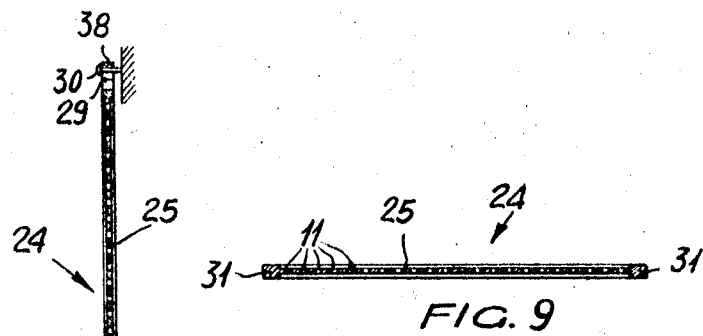
FIG. 8  FIG. 9
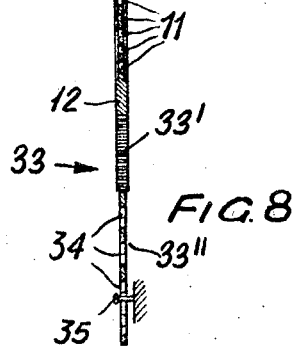
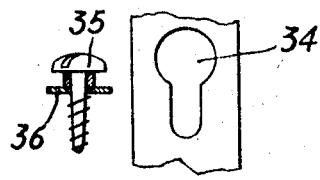
FIG. 10
INVENTOR
LAMBERTO MASI
BY Yount, Racey, Flynn & Tarolli
ATTORNEYS

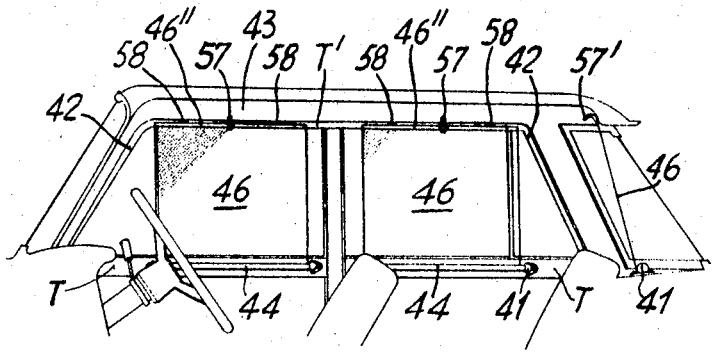

United States Patent Office 3,445,135
Patented May 20, 1969

3,445,135
PERFORATED SUN VISOR PARTICULARLY
FOR MOTOR VEHICLES
Lamberto Masi, Via Cucchiari 3, Milan, Italy
Filed Nov. 4, 1966, Ser. No. 592,214
Claims priority, application Italy, Nov. 29, 1965,
11,695/65, 11,697/65; Jan. 24, 1966, 13,741/66;
Sept. 16, 1966, 22,504/66
Int. Cl. B60j 3/00
U.S. Cl. 296—97                      3 Claims

ABSTRACT OF THE DISCLOSURE

A filter sun visor for motor-vehicles, comprising an opaque surface, passed through by a plurality of small through holes in a quincunx pattern, said holes being of a diameter from 0.5 to 1.5 mm. and the mutual distance between the centres being from 1.5 to 4 mm.

---

The object of this invention is a novel sun visor to be particularly used in motor vehicles to protect both the driver and passengers from sunbeams and from rays of dazzle or semidazzle lights. This novel visor allowing visibility and removing dazzling is characterized by a surface of opaque material, in which there are formed a plurality of small through holes regularly distributed according to a quincunx pattern. The holes are spaced apart and may be of a diameter from 0.5 to 1.5 mm. and the mutual distance between the centres thereof may be from 1.5 to 4 mm. The holes may also have a shape other than circular. This actually ideal perforated visor surface is adapted to many applications, all of which being intended for the same antidazzle purpose, but being carried out in different forms, such as a visor to be applied in front of the driver's seat in replacement of the existing opaque sun visor; as an additional visor to be attached to the edge of the existing opaque sun visor; as a curtain to be applied to the side and rear windows, which curtain may be rigid, semirigid or flexible, and which in the latter case may be wound on a housing roll and subjected to the action of a winding spring, the effect of which being overcome in order to draw the visor from the roll and to stretch it onto the window surface.

In all such applications there will be the advantage of a clear outward visibility, without suffering from dazzling due to sunbeams or dazzle lights of other vehicles.

The accompanying drawing schematically shows, only by way of example, the various applications for the perforated visor of this invention, and namely:

FIG. 7 is a front view of a semirigid curtain applied to a motor vehicle window;

FIG. 8 is an enlarged vertical cross-section according to line 8—8 of FIG. 7;

FIG. 9 is a transverse cross-section;

FIG. 10 is an enlarged view showing a preferred design of a grip means and respective attachment ear or grommet;

FIG. 11 shows the inner space of a motor vehicle, the windows of which are provided with flexible curtains wound on a roll and unwindable by overcoming a resilient action;

FIG. 12 shows the paired curtains for the rear window of the motor vehicle; and

FIGS. 13–16 show the upper hooking member for the side curtains, particularly for the vehicle doors.

Figure 1:
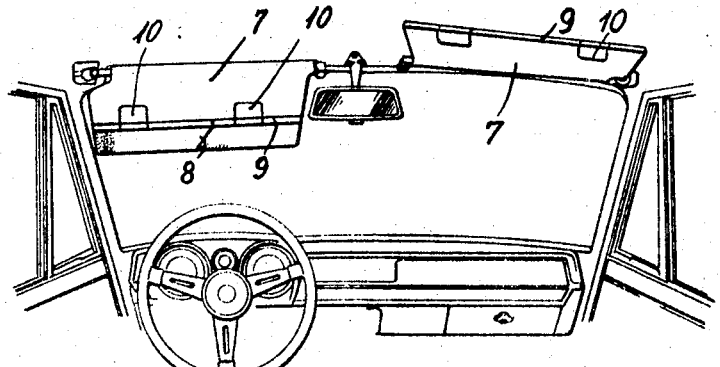
FIG. 1 is an internal view of the front driving part of a motor vehicle having conventional sun visor provided with subsidiary sun visors according to the invention.

FIG. 1 shows a sun visor 7 on the lower side of which the perforated visor 8 is applied in the form of a subsidiary visor, said visor being overturnable about a hinge 9 anchored to the usual sun visor 7 by clamps 10, preferably made of semirigid plastic material.

The perforated visor 8 forming the ancillary visor has a slightly tapered cross-section (FIGS. 5 and 6) and is passed through by a plurality of holes 11 disposed as a quincunx pattern, the features of which have been already indicated, that is hole diameter from 0.5 to 1.5 mm. and distance between hole centres from 1.5 and 4 mm.

Preferably, the perforated visor 8 in front of the driver is divided into two portions: 8' on the left, and 8" on the right (FIG. 4), by an inclined cut 12, at which the complementary steps 12' and 12", are, of which the second 12" is superimposed to the first 12' so that the segment 8' can upwardly draw with its rotation also the segment 8", and not conversely.

Clamp 10 is formed of two jaws 10', which are also slightly upwardly tapered and preferably moulded of semirigid plastic material, so that at inoperative or rest condition the ends thereof will nearly contact; moreover, pointed extensions 13 facilitating the grip on the springed surface of visor 7 are provided on the two inner faces of jaws 10'.

Figures 2, 3:
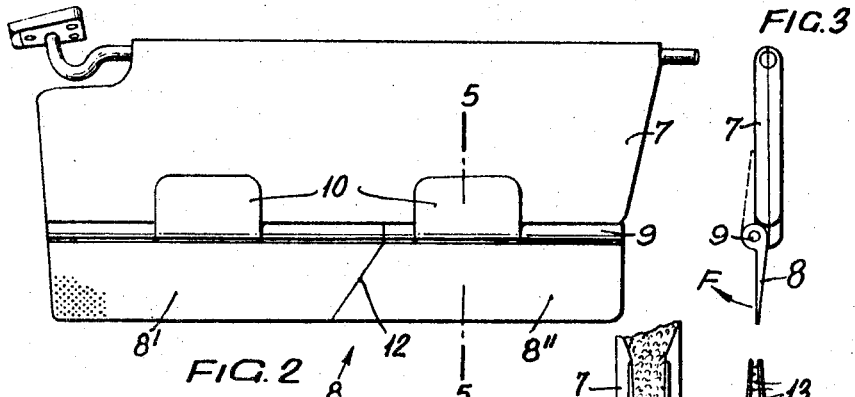
FIG. 2 is an enlarged front view of the conventional sun visor provided with a moving sun visor.
FIG. 3 shows the contour of FIG. 2.
Figures 4, 5, 6:
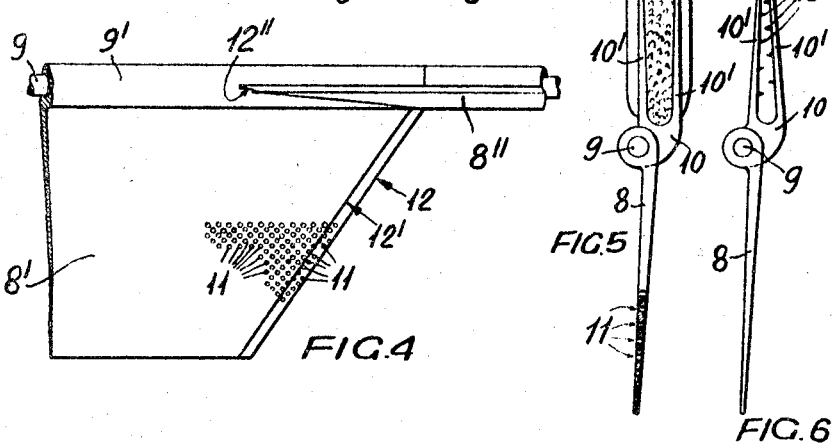
FIG. 4 is an enlarged view showing a portion of the visor in FIG. 2 with the left section in a vertical position and the right section raised by 90°.
FIG. 5 is an enlarged sectional view taken along line 5—5 of FIG. 2.
FIG. 6 shows the same visor of FIG. 5 according to a side view, with the fastening clamp in an inoperative position.

As can be seen in FIGS. 5 and 6, hinge 9 is located at a displaced position relative to the axis of opaque visor 7 and displacement is to the driver, so that rotation in direction of arrow F (FIG. 3) will allow perforated visor 8 to be adhered against surface of opaque visor 7 after overturning (dotted line).

Instead of being formed as an ancillary visor 8, the perforated sun visor may fully replace sun visor 7 and be directly hinged at 9' on the body (FIG. 4) without any need for clamps 10.

In the drawing, the case in which the visor is applied to a left-hand drive motor vehicle is contemplated; obviously, in case of a right-hand drive the visor will be made in an equal specular manner to achieve the same objects and results.

In FIGS. 7–10, the perforated visor 12 according to the invention is applied to the side windows in the form of a panel-curtain 24 formed of a sheet, which is quadrangular in the drawing, but which may be practically of any other form to accommodate to the peripheral shape of the windows to which it is applied. The general surface 25 of panel 24 is passed through by a plurality of through holes 11 in a quincunx pattern, with a diameter from 0.5 to 1.5 mm. and arranged at a mutual distance from 1.5 to 4 mm.

The panel which, according to consistency and equality of material being used, may be of a thickness varying from 0.5 to 2 mm., is preferably strengthened along the upper side by an enlarged edge 28 on which two series of ears or grommets 29 are formed for the two grips 30 fixed the body wall and on which panel 24 can be overhung at the desired position; equal peripheral enlargements 31 may be provided on the vertical sides 32, and on the bottom side from which a stop tongue 33 axially extends, said tongue being preferably formed of a resilient section 33' followed by a semirigid section 33" in which two or more ears or grommets 34 are provided, in which grommets one of grips 35 provided at the bottom will insert, so as to effect a more or less strong tension depending upon the window height and blast entering from the window, when the latter is open. In the case of the drawing, grips 35 are shown as juxtaposed in number of three and are, for example, formed of convex screws (FIG. 10) with a collar washer 36 as a spacer (FIG. 10).

When the perforated visor is a flexible visor in the form of a curtain, it will be wound on a cylindrical core and placed into a tubular housing 40 provided with an exit slot and subjected to the action of a spring tending to inwardly return the visor, so that the drawing thereof will occur by overcoming the spring action. At the ends, the tubular housing 40 is provided with supporting means 41 fixed to door frames 42 such as by self-tapping screws or the like.

Curtain 46 is upwardly unwound by grasping the grip tongue 57 located intermediate of the rigid edge 46″; two hooks 58, located to the two ends, are provided on said edge. At said hooks 58 and on the upper cross member 43 of the door frame two supporting means 59 are secured, said supporting means (FIGS. 13 and 14) being formed of: an angle bar 60 securable to said cross member by screws 60′; a downwardly facing extension 61 of said element 60, pivoted at 62 to the former, so as to move it to an orthogonal position when inoperative, as seen in FIG. 16. The two terminal positions are assured by two abutment steps 64 in extension 61 and by a stop 63 (FIGS. 15 and 16) in angle bar 60; the latter is further provided with a plurality of slits 65, one of which will be selected as a seating for hook 68.

For the rear window there is provided a cylindrical housing 44 of a length proportioned to the extension of said window; therefore, for a greater use convenience and movement easiness, within said housing 44 two interindependent curtains 46 are arranged; such curtains are provided with gripping tongues 57′ which are somewhat longer than those for the side curtains since they have a through ear or grommet 56 by which the curtain is retained by the projecting grip 57 provided at a fixed position on the body ceiling of the vehicle.

In the example relative to the application of perforated curtains, the most convenient solution has been chosen, according to which the housing containing the roller curtain is applied to the body at the lower frame of the window, whereas the tensile hooks are applied along the upper edge of said window.

However, it is apparent that the housing containing the roller curtain could also be applied along the upper edge and the hooks be fixed to the lower edge.

This variant need not to be shown in the drawings, since fulfillment thereof will be apparent to any skilled person who has seen how the application of the roller curtain has been carried out in accordance with FIGS. 11–16.

The material being used for forming the perforated visors according to the invention may be various; rigid or semirigid material for the sun visor and flexible material for the roller curtains.

It has also been found that the inner surface of the visor that is the surface facing inwardly of the interior space, must be black or dark, whereas the outwardly facing surface must be white or light, in order not to absorb the sun heat and transmit it to the inside.

The light outer colour for the sun visor may even be omitted, as the dimensions thereof are reduced and the heating surface is unaffecting. The inside surface of the sun shade is black or dark to provide a contrast between the dark sun shade and an object outside the vehicle which is brighter than the inner surface of the sun shade.

What is claimed is:

1. A screen assembly adapted to be mounted adjacent to a window of a vehicle to protect occupants of the vehicle against glare, said screen assembly comprising a housing adapted to be mounted along one edge portion of the window of the vehicle, a spindle mounted within said housing, spring means connected to said spindle for urging said spindle to rotate in a predetermined direction, a flexible sheet of opaque material connected at one end portion to said spindle, said sheet of material defining a plurality of apertures arranged in a predetermined pattern on the surface of said sheet of material to enable light to pass through said sheet of material and to minimize glare, stop means connected to an opposite end portion of said sheet of material for engaging said housing to prevent movement of said spindle in said predetermined direction under the influence of said spring means when said flexible sheet of opaque material is substantially wound around said spindle, and retaining means adapted to be secured to said vehicle adjacent to an edge portion of said window opposite from said one edge portion of said window to hold said sheet of material in an extended condition against the influence of said spring means, said sheet of material having a darkly colored inner surface which faces toward the occupants of the vehicle when said sheet of flexible material is in an extended condition to provide a contrast between said sheet of material and objects outside of the vehicle viewed through said apertures in said sheet of material and the window of the vehicle, said sheet of material having a lightly colored outer surface which faces away from the occupants of the vehicle when said sheet of flexible material is in the extended condition to minimize the radiation of heat into the vehicle.

2. A screen assembly as set forth in claim 1 further including hook means connected to said opposite end portion of said sheet of material for engaging said retaining means to hold said sheet of material in said extended condition, said retaining means including a first member adapted to be fixedly connected to the vehicle adjacent to the edge portion of said window which is opposite from said one edge portion of said window, a second member pivotally connected to said first member and pivotal from an operative position extending toward said one edge portion of said window and a storage position extending transversely to said first member and away from said one edge portion of said window, said second member defining a plurality of apertures which are selectively engageable by said hook means when said second member is in said operative position to hold said sheet of material in said extended condition.

3. A screen assembly as set forth in claim 1 wherein said apertures in said sheet of material are uniformly spaced apart from each other and are arranged in a quincunx pattern, each of said apertures having a diameter of 0.5 to 1.5 mm. and a mutual distance between centers of less than 4.0 mm. and more than 1.5 mm.

References Cited

UNITED STATES PATENTS

| 1,589,475 | 6/1926 | Lowther | 296—97 |
| 1,928,249 | 9/1933 | Eisenzopp et al. | 296—97 |
| 1,990,222 | 2/1935 | Burlein | 296—97 |
| 2,232,303 | 2/1941 | Bailey | 296—97 |
| 3,183,033 | 5/1965 | Stulbach | 296—97 |
| 3,025,098 | 3/1962 | Andrews | 296—97 |
| 1,876,430 | 9/1932 | Miller | 296—97 |

BENJAMIN HERSH, *Primary Examiner.*

L. D. MORRIS, JR., *Assistant Examiner.*